(12) United States Patent
Gupta

(10) Patent No.: US 8,026,923 B1
(45) Date of Patent: Sep. 27, 2011

(54) CONTEXTUAL VARIABLE ATTRIBUTE SCALING

(75) Inventor: Rahul Gupta, New Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 496 days.

(21) Appl. No.: 11/370,401

(22) Filed: Mar. 7, 2006

(51) Int. Cl.
*G09G 5/00* (2006.01)

(52) U.S. Cl. ........ 345/581; 345/468; 345/471; 345/472; 345/619; 345/622; 345/628

(58) Field of Classification Search ............ 345/628
See application file for complete search history.

(56) References Cited

U.S. PATENT DOCUMENTS

| | | | |
|---|---|---|---|
| 5,539,868 A | * | 7/1996 | Hosoya et al. ............ 345/471 |
| 5,754,873 A | | 5/1998 | Nolan |
| 6,043,823 A | * | 3/2000 | Kodaira et al. ............ 345/619 |
| 6,915,484 B1 | | 7/2005 | Ayers et al. |
| 6,928,611 B2 | | 8/2005 | McCully et al. |

OTHER PUBLICATIONS

McClelland, "Adobe in Design CS: One-On-One," 2004, pp. 45-193; Deke Publishing; USA.
Pfiffner and Fraser, "How Desktop Publishing Works," 1994, pp. 38-81, Ziff-Davis Press; USA.

* cited by examiner

*Primary Examiner* — Antonio Caschera
(74) *Attorney, Agent, or Firm* — Robert C. Kowert; Meyertons, Hood, Kivlin, Kowert & Goetzel, P.C.

(57) ABSTRACT

Embodiments for contextual variable scaling relate to selection of objects. For example, such objects may include text, audio, visual, and/or physical objects. In one or more examples, such objects may be selected for variable scaling. For example, variable scaling of such selected objects may be based at least in part on a beginning attribute value and/or an ending attribute value.

22 Claims, 15 Drawing Sheets

Might is right. Might is right. Might is right. Might is right.
Might is right. Might is right. Might is right. Might is right.
Might is right. Might is right. Might is right. Might is right.
Might is right. Might is right. Might is right. Might is right.
Might is right. Might is right. Might is right. Might is right.
Might is right. Might is right. Might is right. Might is right.
Might is right. Might is right. Might is right. Might is right.

420

Might is right. Might is right. is right. Might is right. Might is Might is right. Might is right. Might is right. Might is right. is right. Might is right. Might is right. Might is right. Might is right. Might is Might is right. Might is right. Might is right. right. Might is right. Might is right. Might is

| R a n k | Company | Revenue in Millions | Revenue Changed | Highest Ranking IT Executive | Title | Industry |
|---|---|---|---|---|---|---|
| 1 | Marshall Industries | 1,462 | 23% | Raj Jha | Dir., E-Commerce & IT | Retail & Distribution |
| 2 | Knight Ridder | 3,091 | 7% | Larry Marberi | VP, Prod. & Facilities | Media & Entertainment |
| 3 | Microsoft Corp. | 14,848 | 28% | Rick Devenuti | CIO | Information Technology |
| 4 | CIT Group Inc. | 2,271 | 7% | John Fischer Jr. | Sr. VP | Banking & Financial Service |
| 5 | Sprint Corp. | 17,134 | 15% | George Fuciu | Pres. Tech. Services | Telecommunications |
| 6 | Cabletron Systems Inc. | 1,411 | 2% | Henry Fiallo | Sr. VP | Information Technology |
| 7 | State Street Bank & Trust | 45,710 | 29% | John Fiore | CIO | Banking & Financial Services |
| 8 | Raytheon Co. | 19,530 | 43% | James Infinger | VP & CIO | Electronics |

520

| R a n k | Company | Revenue in Millions | Revenue Changed | Highest Ranking IT Executive | Title | Industry |
|---|---|---|---|---|---|---|
| 1 | Marshall Industries | 1,462 | 23% | Raj Jha | Dir., E-Commerce & IT | Retail & Distribution |
| 2 | Knight Ridder | 3,091 | 7% | Larry Marberi | VP, Prod. & Facilities | Media & Entertainment |
| 3 | Microsoft Corp. | 14,848 | 28% | Rick Devenuti | CIO | Information Technology |
| 4 | CIT Group Inc. | 2,271 | 7% | John Fischer Jr. | Sr. VP | Banking & Financial Service |
| 5 | Sprint Corp. | 17,134 | 15% | George Fuciu | Pres. Tech. Services | Telecommunications |
| 6 | Cabletron Systems Inc. | 1,411 | 2% | Henry Fiallo | Sr. VP | Information Technology |
| 7 | State Street Bank & Trust | 45,710 | 29% | John Fiore | CIO | Banking & Financial Services |
| 8 | Raytheon Co. | 19,530 | 43% | James Infinger | VP & CIO | Electronics |

Figure 5

Tools for the new Work! Tools for the new Work! Tools for the new Work!

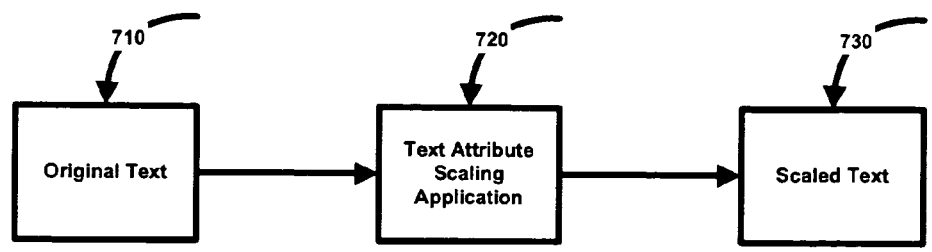
Figure 7-A
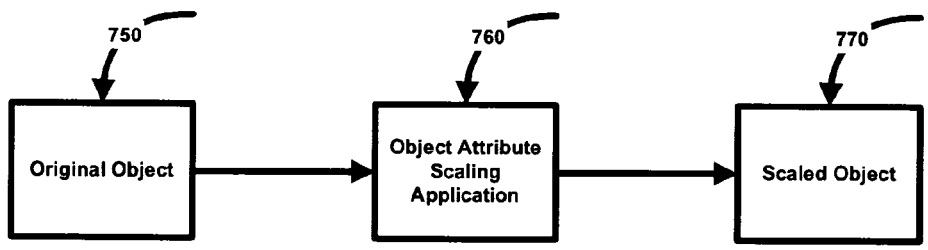
Figure 7-B

CONTEXTUAL VARIABLE ATTRIBUTE SCALING

BACKGROUND

This disclosure relates to computer digital publishing.

Computer generated text may be defined in part by attributes such as type face and size. These attributes may be static. Each attribute may have an associated value. For prior computing platforms, a user may select a region of desired text and manually apply changes to selected attributes. A familiar example is where a user selects a region of text currently rendered at 10 points and changes this to 12 points. In so doing all of the text in the selected region may share a common size attribute value, that of 12 points for this example. Alternatively, a user may more variedly affect a region of text by applying a style. A character style, by way of example, perhaps referred to as "Normal," may be defined with a character size set to 12 points. If the "Normal" style is applied to a region of text, the entire region of text may be rendered with this constant and uniform character size. A paragraph style may also be applied to a region of text and affect multiple attributes nearly simultaneously. A selected paragraph style may be defined to affect the font, size, interline spacing, and/or margins of a selected paragraph for instance. A style may then be used, re-used, and/or referenced and applied to a region of text. A potential drawback for prior style formatting is that the value of an attribute is constant for a given style.

Computer objects may be similarly constrained. Prior systems may accommodate a box filled with text as an object. Applying an effect such as squeezing one end of the object while expanding the other end works only upon the object. The textual content of the box object may be treated as an image. Changes may be applied to the object and not to the contents of the object, here the text. For this example, the attributes of the image are altered but not those of the underlying text. Similarly, varying the size or rotation attributes of objects may require individual attention to the separate objects.

Previous systems and methods may not accommodate scenarios where the user may want to vary the value of an attribute across a region. For prior systems, a user may only do this by manually selecting each and every individual text character or object and applying the user-intended attribute value. Because these attributes may be overrides to the individual attributes and may be specific to a particular text character or object in a particular location, they cannot be re-used. Accordingly, the user modified formatting can not be copied and re-applied to a different region of text characters or objects. Such manual variation may be time consuming and typically does not provide sufficient control or even a professional look to a project.

BRIEF DESCRIPTION OF THE DRAWINGS

Subject matter is particularly pointed out and distinctly claimed in the concluding portion of the specification. Claimed subject matter, however, both as to organization and method of operation, together with objects, features, and advantages thereof, may best be understood by reference of the following detailed description if read with the accompanying drawings in which:

FIG. 2a depicts an example line of text reflowed in accordance with an embodiment;

FIG. 2b depicts an example line of text reflowed in accordance with an embodiment;

FIG. 4 depicts multiple lines of text reflowed in accordance with an embodiment;

FIG. 5 depicts a table of text before and after operation of an embodiment;

FIG. 7a is a flow diagram of an example embodiment of a method for scaling text attributes;

FIG. 7b is a flow diagram of an example embodiment of a method for scaling object attributes;

DETAILED DESCRIPTION

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures, and components have not been described in detail so as not to obscure the claimed subject matter.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" and/or "an embodiment" in various places throughout this specification are not necessarily all referring to the same embodiment. Furthermore, the particular features, structures, and/or characteristics may be combined in one or more embodiments.

Unless specifically stated otherwise, as apparent from the following discussion, it is appreciated that throughout this specification discussions utilizing terms such as "processing," "computing," "calculating," "selecting," "forming,"

"enabling," "inhibiting," "identifying," "initiating," "querying," "obtaining," "hosting," "maintaining," "representing," "modifying," "receiving," "transmitting," "storing," "determining" and/or the like refer to the actions and/or processes that may be performed by a computing platform, such as a computer or a similar electronic computing device, that manipulates and/or transforms data represented as physical, electronic and/or magnetic quantities and/or other physical quantities within the computing platform's processors, memories, registers, and/or other information storage, transmission, reception and/or display devices. Accordingly, a computing platform refers to a system or a device that includes the ability to process and/or store data in the form of signals. Thus, a computing platform, in this context, may comprise hardware, software, firmware and/or any combination thereof. Further, unless specifically stated otherwise, a process as described herein, with reference to flow diagrams or otherwise, may also be executed and/or controlled, in whole or in part, by a computing platform.

Figure 1:
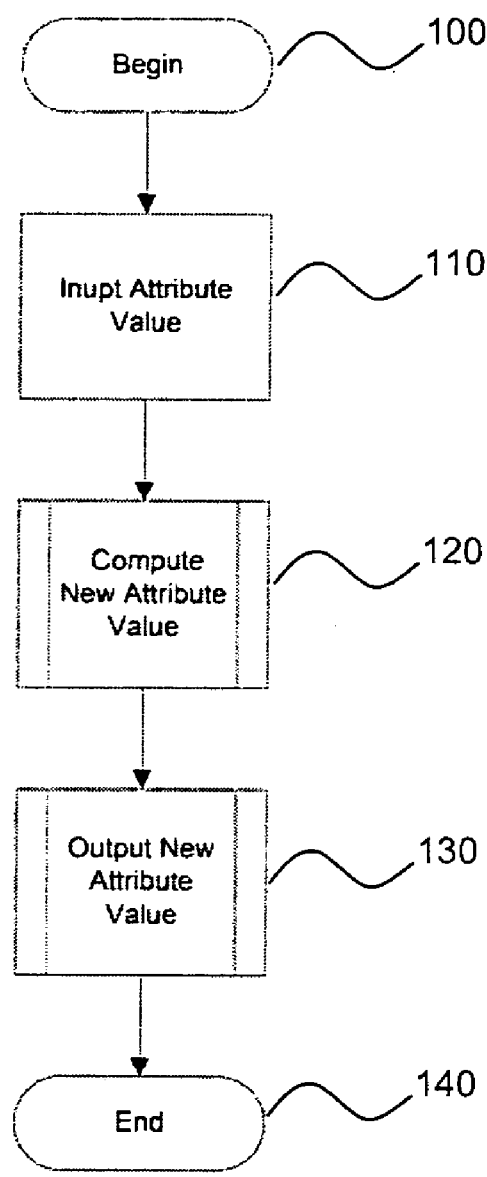
FIG. 1 is a flow chart depicting an example embodiment of a method for computing a new attribute value.

FIG. 1 is a flow chart depicting an example embodiment of a method for computing a new attribute value. A process may begin at block 100 perhaps under the direction of a user and/or computing program. At block 110 an attribute value may be received from an attribute source. For an embodiment, the attribute source may include text or computer objects and the attribute value may describe some attribute such as size, although the scope of the claimed subject matter is not limited in these respects. At block 120 a new attribute value based at least in part upon the attribute value received at block 110 may be generated. Other factors that may contribute to the generation of new attribute values are discussed below. At block 130 a new attribute value may be output. The process may end at block 140. An embodiment in accordance with claimed subject matter may include all, more than all or less than all of blocks 100-140. Furthermore, the order of blocks 100-140 is merely an example order, and the scope of the claimed subject matter is not limited in this respect.

FIGS. 2a and 2b depict example lines of text reflowed in accordance with an embodiment. For this example, the lines of text may be reflowed in accordance with the embodiment discussed above in connection with FIG. 1. FIG. 2a shows a line of text 210 composed of a series of individual characters of text. Line 220 depicts a result of processing line 210 in accordance with the embodiment discussed above in connection with FIG. 1. Allowing for this example that all of the text characters in line 210 share a common size attribute, note how this same size attribute is varied from smaller than original on the left end of line 220 to larger than original on the right end of line 220. New size attribute values for each character of text in the original line 210 are calculated to produce line 220. For this example, the new attribute values may be computed along a linear scale utilizing a linear function from the smallest to the largest size characters. Also for this example, the gradient of size difference between any two text characters along line 220 is substantially the same gradient of size difference as between any other two adjacent text characters along this line as the linear function is used to interpolate a uniform step size. Alternatively, an embodiment may utilize a step function that steps in accordance with a specified step increment.

FIG. 2b presents an illustration of an alternative output in accordance with the embodiment discussed above in connection with FIG. 1. Line 230 is similar to line 210 in that each shows a line of text characters each having a similar size attribute to others on the line. Referring again to the embodiment depicted in FIG. 1, new attribute values are computed at block 120 for the size of each character of line 230. At block 130, the new attribute values are used to produce the altered line of text 240. For this example, the size attribute for the characters along line 240 are varied from the smallest size at either end of the line to the largest size at the center. Here, again, the change in the size gradient between any two adjacent characters is substantially the same as between any other two adjacent text characters due to interpolation. For this example, the new size attribute values may be computed at block 120 using a bell shaped function thus producing the distinctive output of line 240. An embodiment may create a selected result by operating upon line 230 in two separate linear text runs or may produce the effect utilizing beginning, intermediate, and ending values. Additional functions that may be used either with interpolation or without interpolation include, but are not limited to, sinusoidal, elliptical, and parabolic functions. An embodiment may be used to transform the time attribute associated with a region or sub-region. For example, on a display the size attribute for a character or word may be set smaller then larger then smaller again over time to draw attention to the particular character or word. By way of contrast, the time attribute for a character on a printed page may be unchanging. In one or more embodiments a time attribute comprises time references in data such as, for example, SMPTE time code.

With digital publishing, each character of text, or type, may exist within a species of frame called a text frame. Text frames may also be known by other terms, such as for example text boxes and text blocks. Text frames may be independent objects as are shapes. A text frame may comprise a container filled with text just as geometric shapes may often be filled with color. A text frame may hold a region of text or itself individually be a region or sub-region. In one or more embodiments a transformation may be applied to a collection of text frames. Text frames may be any shape or size. A document may have many text frames within it. For example, a document laid out in multiple columns may have each column in an individual text frame. Each column may or may not be a separate region or sub-region. In such a document, multiple text frames holding continuing portions of text may be linked, or threaded, together to form a logical structure. A body of text, such as a story, may be dropped into a first text frame and the digital publishing software may calculate what can fit where. What will not fit in the first frame may flow into subsequent linked frames. This may be referred to as "pouring a document." If changes are later made to the story the digital publishing software may account for these changes, make the appropriate recalculations and reflow, that is flow again, the text to again properly fill the linked text frames. This may also be known as auto flowing a document. In a broader sense and consistent with the embodiments described herein, all computer generated text may be originally flowed when first input to a computer, although the scope of the claimed subject matter is not limited in this respect. In accordance with one or more embodiments, a contiguous and/or non-contiguous series of text boxes may comprise the selected region and a transformation may then be applied across the entire series. The concept of reflowing may be applicable to not only textual elements but also to objects. In fact, any object having associated with it attributes capable of numeric manipulation may be a suitable candidate for flowing, reflowing, manipulating, scaling, and/or transforming in accordance with embodiments of claimed subject matter.

In accordance with one or more embodiments, an object may refer to any item that may be selected, scaled, manipulated and/or transformed by a computing device, such as for example shapes, pictures, images, graphics, video files, audio files, visual files, data files, encoding/decoding techniques, text, and text boxes. Such objects may include, for example, text objects to contain and/or control the layout and/or appearance of text within the object, graphic objects to contain and/or control the layout and/or appearance of graphics and/or images within the object, and/or frames utilized as a border and/or perimeter of another object. In one or more embodiments, graphic may refer to a pictorial and/or image representation of an object, and in one or more alternative embodiments may refer to an object itself. Audio files are objects to contain and/or control sounds recorded, created, and/or to be reproduced. Audio files comprise attributes capable of transformation, that include but are not limited to, attributes associated with loudness/softness, frequency and tempo. Tempo, for example, may be manipulated by transforming the time attribute associated with audio data within or associated with an audio file. In one or more embodiments an object may be a physical object. Examples of physical objects include, but are not limited to, items rendered by 3-D printers, produced by fabrication laboratories, personal fabricators, nano-technology, and/or under computer control, electrical and/or magnetic signals capable of being stored, transferred, combined, compared, and/or otherwise manipulated. For example, such a physical object may be represented, displayed, and/or otherwise manipulated using Adobe® Acrobat3D® software or the like available from Adobe Systems Incorporated of San Jose, Calif., USA. However, these are merely example definitions and illustrations of the above terms, phrases, and/or concepts wherein other definitions and illustrations may apply as well, and the scope of claimed subject matter is not limited in these respects.

Figure 3:
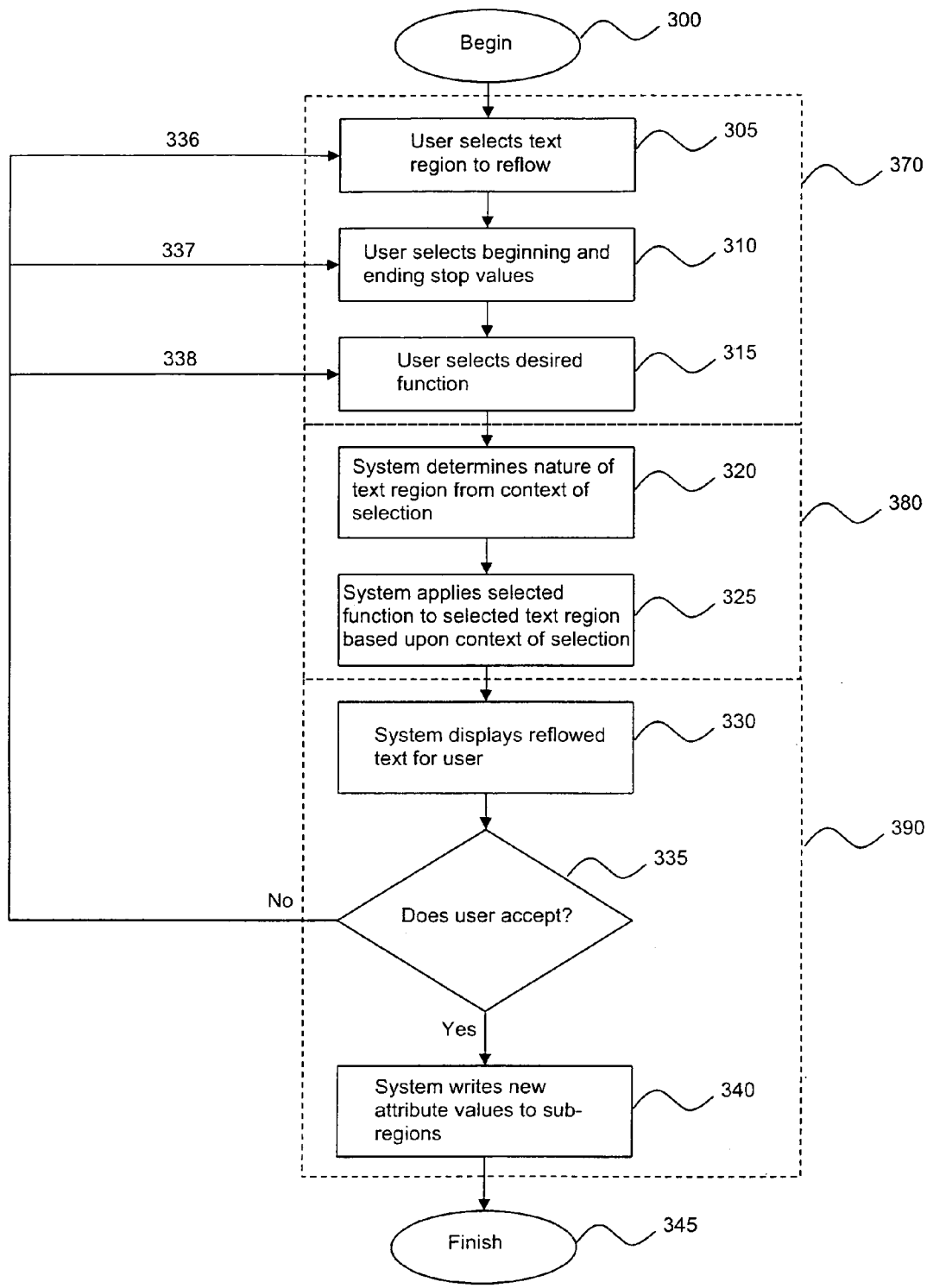
FIG. 3 is a flow chart depicting an example embodiment of a method for reflowing text.

FIG. 3 is a flowchart of an example embodiment of a method for variable attribute scaling. Although text is used in this example, other embodiments are possible for applications not using text. For this example, processing begins at block 300. At block 305, a user selects the region of text, or area of text, as the identified work area the user intends to reflow. Such selection may be accomplished in any of a variety of ways, including by way of non-limiting example, using a computer pointing device such as a mouse or a keyboard. The region of text selected may include, again by way of non-limiting example, a line of single characters such as lines 210 or 230, a page of text, or rows or columns of a spreadsheet. At block 310, a user may select the beginning and ending stop values as control parameters for the endpoints that may define the limits of the modification to be applied. Stop values may comprise attribute values that are used as control parameters. In this example, the stop values may establish how small the smallest and how large the largest text characters will be rendered. For line 220 the beginning stop value may comprise the smallest font size, as displayed on the left end of the sample output line 220 and the ending stop value the largest size as shown on the right end of the example output line 220. Similarly, for sample output line 240 the beginning size attribute may produce the text characters shown at either end of the line while the ending stop value may produce the largest characters at the center of line 240. At block 315, the user may select the effect desired. This may be done by selecting a function or a combination of functions such as, for example, a linear, step, interpolation, bell, and/or recurring function, to name but a few, to apply to the selected text. The selected function or functions may be used to interpolate how many gradients are necessary to more or less uniformly distribute the changes across the region selected.

At block 320, the nature of the selected text region 320 may be determined by examining the context in which the selection was made. For example, if the region of text selected is a line of adjacent characters on a single line, a determination may be made that the transformation be applied from one end of the selected text to the other along the line and the resulting reflow displayed as in example output lines 220 and 240. For an embodiment where a page of text composed of many individual lines of text (see for example lines 410 shown in FIG. 4) is selected as the text region, the system may determine that the transformation be applied down the page in the Y-direction transforming each individual line such that all of the characters on any given line are given the same treatment which is in turn different from that given to lines above or below this line. Alternatively, the system may determine that the transformation be applied across the page in the X-direction transforming each word of text so that each character of text within a word share a similar value for an attribute which is different from the value of the same attribute in a word of text before or after a given word. See for example changes applied in the Y-direction for lines 420 as depicted in FIG. 4.

For another example, a spreadsheet may comprise a number of individual cells arranged by rows and columns. For this example, a determination may be made that each cell containing text be given the same treatment to all characters within the cell. For some embodiments, the treatment given one cell may be different from some or all other cells. Having received the user inputs as to the region of text to transform at block 305, the beginning and ending stop values at block 310, and the function desired at block 315, the system may at block 320 determine the nature of the text selected for transformation from the context of the selected text. Upon determining the nature of the region selected, the system may break the region or area down into sub-regions or sub-areas. A sub-region may comprise the smallest addressable unit the scaling application can manipulate or save new attribute values to. In sample output lines 220 and 240, the sub-regions may comprise the individual text characters while in sample output lines 420 the sub-regions may comprise the individual lines of text. The system may at block 325 apply the selected function to the selected region of text.

For an embodiment, following internal manipulation of the selected text by the system the reflowed text may be displayed as a text run at block 330 for the user to review. If the user is not satisfied with the result the user may have several options at block 335 to choose from. If the user is not satisfied with the region of text selected for reflow the user may, as indicated by arrow 336, select a different region of text at block 305 to reflow with a new transformation. If the user is not satisfied with the beginning and ending stop values the user may, as indicated by arrow 337, select different beginning and ending stop values at block 310 for a subsequent transformation. Further, if the user is not satisfied with the particular function chosen the user may, as indicated by arrow 338, choose another function at block 315 for an alternative transformation. If the user is satisfied with the results the user may accept the results at block 335 and the system may then write the new attributes to each sub-region as appropriate at block 340. Alternatively, the attribute values may be stored in an associated data structure. The data structure may be stored at a memory or other storage medium for example. The process may complete at block 345. For this example embodiment, a meta level 370 comprising blocks 305, 310, and 315 may correspond to block 110 depicted in FIG. 1, a meta level 380 comprising blocks 320 and 325 may correspond to block 120 depicted in FIG. 1, and a meta level 390 comprising blocks 330, 335, and 340 may correspond to block 130 depicted in FIG. 1.

In an alternative embodiment, a saved or copied style may be applied at meta level 370. Using a style in such a manner may allow for ease in reusing beginning and ending stop values as well as a selected function together as a unit for example. Additionally, changes to a style may be allowed to cascade through a project and give all text or objects based upon the same style a similar treatment. An embodiment may support a style nested within a style.

An embodiment in accordance with claimed subject matter may include all, more than all or less than all of blocks 305-340. Furthermore the order of blocks 305-340 is merely one example order, and scope of the claimed subject matter is not limited in this respect.

FIG. 4 depicts multiple lines of text reflowed in accordance with an embodiment. Lines of text 410 depict unaltered lines. Lines 420 depict a possible output of the embodiments described above in connection with FIGS. 1 and 3. For this example, the size attribute is varied in the Y-direction of the original text. For other examples, one or more attributes may be varied in the X-direction. Similarly, attributes may be varied at an any angle.

FIG. 5 shows a table of text before and after conversion in accordance with an embodiment. An original table 510 may be formatted with all non-header rows sharing a common size attribute value. A post-transformation table 520 for this example demonstrates size scaling in the company, revenue in millions, and revenue changed columns. For this example, the context for the transformation may be identified as the columns. However, for other examples, rows or cells may similarly be utilized.

Figure 6A:
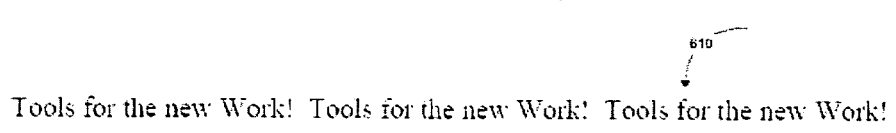
FIG. 6a depicts text formed along a text path in accordance with an embodiment.
Figure 6B:
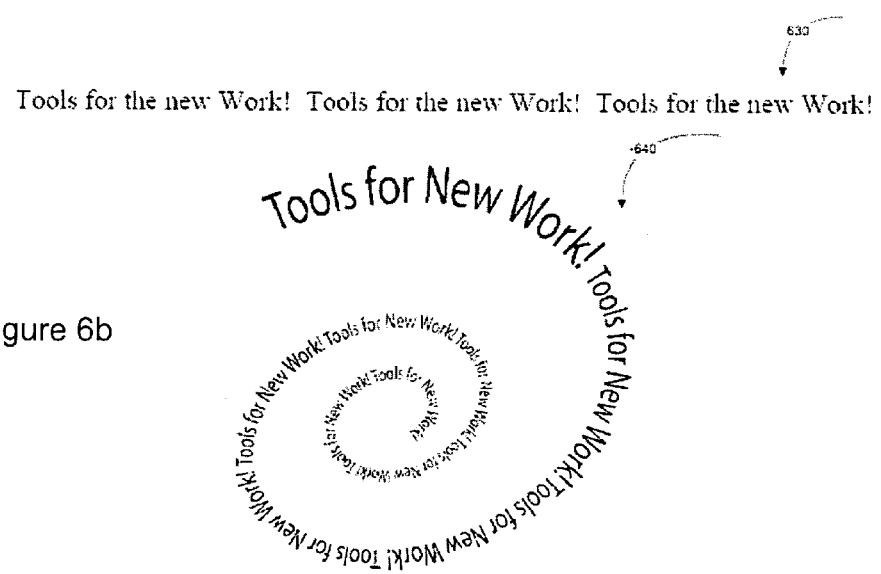
FIG. 6b depicts text formed along a text path in accordance with an embodiment.

In another embodiment, text may be caused to flow and/or reflow along the contours of a line, stroke, or shape. An example of a line is a curve. When text flows along a curve the curve may comprise a path. Such text or type may be referred to as type on a path or path type. FIG. 6 provides two examples employed in such situations in accordance with one or more embodiments. Line 610 depicts a simple line of text. In this particular example the phrase is repeated. Text 620 shows the text of line 610 fitted to a line, which is for this example may be visible, using a linear function. A beginning stop value may be used to produce the small sized text on the left end of line 620 while an ending stop value may be used to produce the text size at the right-hand end of line 620. For another example, text of line 630 may be fitted to a line, not visible for this example, so that text 640 seemingly spirals into the page. For this example, the beginning stop value may define the large sized text while the ending stop value may define the small sized text or vice versa. A linear function may be employed for this example, however the scope of the claimed subject matter is not limited in this respect.

FIG. 7a is a flow diagram of an example embodiment of a method for scaling text attributes. At block 710, an original text is provided. At block 720, any of a wide range of text attribute scaling operations may be performed. At block 730, the scaled text is output.

FIG. 7b is a flow diagram of an example embodiment of a method for scaling object attributes. At block 750, an original object is provided. At block 760, any of a wide range of object scaling operations may be performed. At block 770, the scaled object is output. The text and/or object scaling operations at blocks 720 and/or 760 may correspond to example embodiments for attribute scaling discussed above in connection with FIGS. 1-6.

Figure 8A:
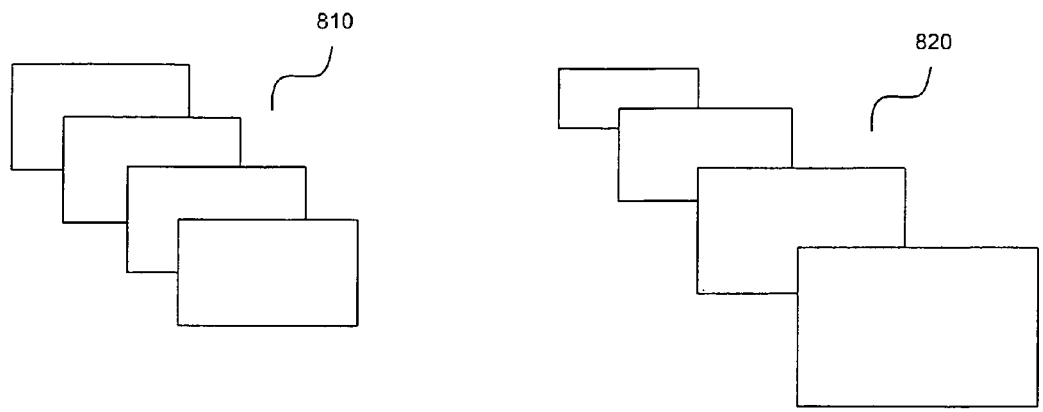
FIG. 8a depicts results of an operation on objects in accordance with an embodiment.

FIG. 8a depicts results of an operation on objects in accordance with an embodiment. For this example, a series of similarly sized frames 810, each having the same size attribute, processed in accordance with one or more embodiments described herein to produce objects 820. For this example, the sub-regions, or sub-areas, comprise the individual frames. Also for this example, the beginning stop value may comprise the size attribute for the smallest frame and the end stop value may comprise the size attribute for the largest frame. For this example, the beginning and end stop values may be utilized by a simple linear function.

Figure 8B:
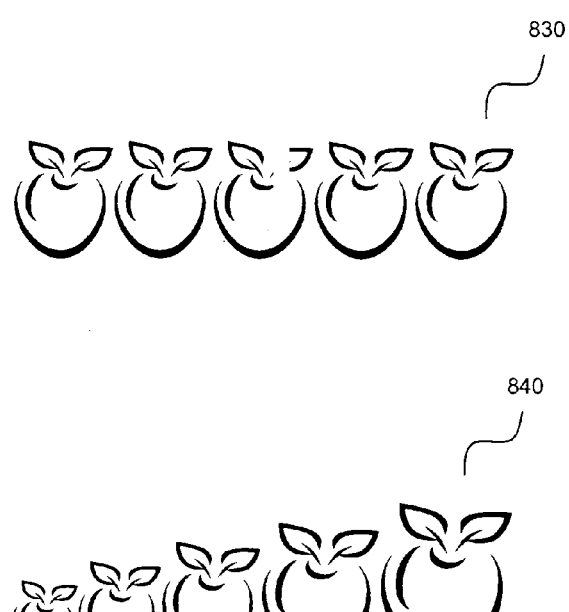
FIG. 8b depicts results of an operation on objects in accordance with an embodiment.

FIG. 8b depicts results of an operation on objects in accordance with an embodiment. For this example, a series of objects (apples) 830 share the same size attribute. After processing the apples have dissimilar size attributes, as depicted by apples 840. For this example, the beginning stop value may comprise a size attribute for the largest size apple object and the end stop value may comprise a size attribute for the smallest apple object. Also for this example, a simple linear function may be applied from right to left. The operations described in connection with FIGS. 8a and 8b are merely examples, and the scope of the claimed subject matter is not limited in these respects.

Figure 9A:
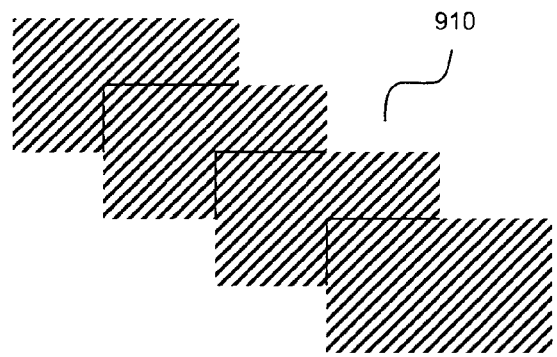
FIG. 9a depicts results of an operation on object attributes in accordance with an embodiment.
Figure 9B:
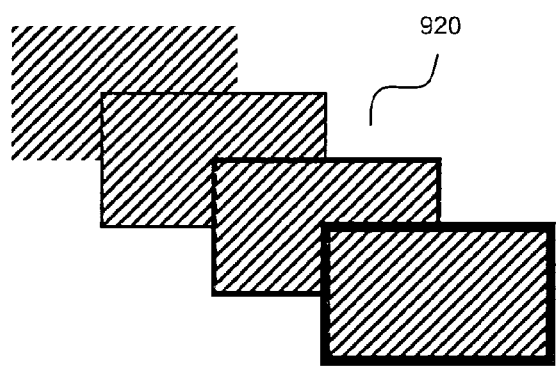
FIG. 9b depicts results of an operation on object attributes in accordance with an embodiment.
Figure 9C:
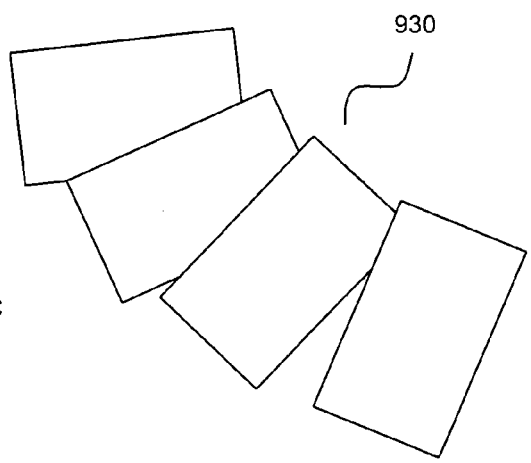
FIG. 9c depicts results of an operation on object attributes in accordance with an embodiment.

As discussed previously, size attributes are not the only attributes that may be altered in accordance with claimed subject matter. FIGS. 9a, 9b, and 9c demonstrate the application of example embodiments to other example attributes. FIG. 9a shows a series of identical rectangles 910. Selecting all four of the rectangles for this example may establish the region or area for processing. For this example, before processing none of rectangles 910 had a border. After processing, the rectangles 910 have visible borders. For this example, an attribute previously non-existent or set to zero is either added or set to a value making what was previously unviewable, viewable. In FIG. 9b, the weight of the border attribute is either added or set to a non-zero value. Successive rectangles 920 may have either increasing or decreasing weight (width) to their borders depending upon whether the viewing perspective is from front to back or the reverse. FIG. 9c depicts rectangles 930 whose orientation attribute may be altered. The orientation attribute of an object is yet another attribute that may be altered using embodiments described herein. The rectangles 930 are shown rotated through an angle in FIG. 9c. Again for this example the totality of the rectangles 910 shown in FIG. 9A are selected as the area for modification. Each rectangle, an object, comprises a sub-area. Viewing from left to right reveals that the change in the angle of rotation from one rectangle to the next may be reduced from the previous rectangle. A large start value, shown at the left, may give way to a smaller end value on the right. FIGS. 9a-9c depict a variety of ways that various attributes may be altered in accordance with claimed subject matter. However, the scope of the claimed subject matter is not limited in these respects.

Figure 10:
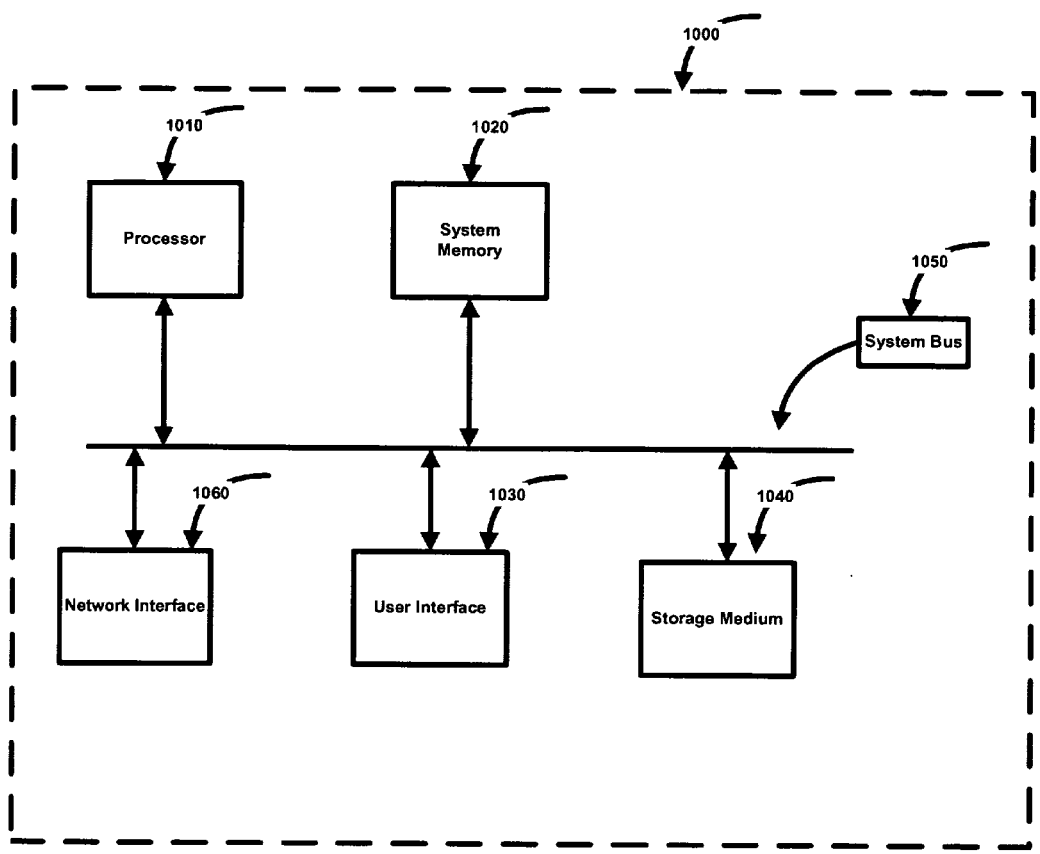
FIG. 10 is a block diagram of an example embodiment of a computer system for variably scaling attributes.

FIG. 10 is a block diagram of a system 1000 that includes a processor 1010 coupled to other components via system bus 1050. System memory 1020 is coupled to system bus 1050. A user interface 1030 is also coupled to system bus 1050. A user interface 1030 may include a keyboard, pointing device, display, printer, sound speaker, and/or lights, for example. A storage medium 1040 is coupled to the system bus 1020. Further, a network interface 1060 is coupled to the system bus 1050. Although example system 1000 is shown with a particular configuration of components, other embodiments are possible using any of a wide range of configurations. The term "computer system" as used herein is meant to include any electronic device capable of executing software and/or firmware instructions. System 1000 may be used to perform some or all of the various functions discussed above in connection with FIGS. 1-9.

Figure 11:
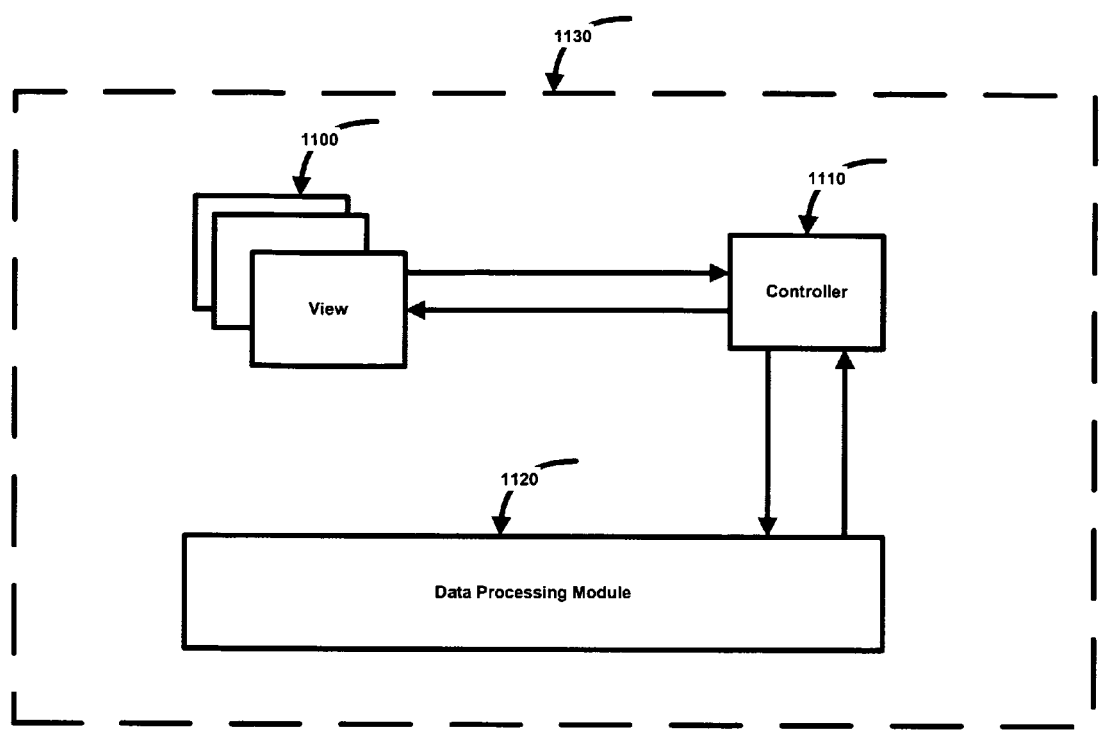
FIG. 11 is a block diagram of an example embodiment of a computer software application for variably scaling attributes.

FIG. 11 is a block diagram of an example embodiment of a computer software application for variably scaling attributes. For this example, input may be handled by a controller module 1110 and output may be handled by the view module 1100. Together, modules 1100 and 1110 may comprise a user interface 1130. Data and processing may be handled by the data and processing module 1120. This module may also be referred to as the model. From the example logical view of FIG. 11 it will be apparent to those skilled in the art that one may have multiple views 1100 of the same model 1120.

Figure 12:
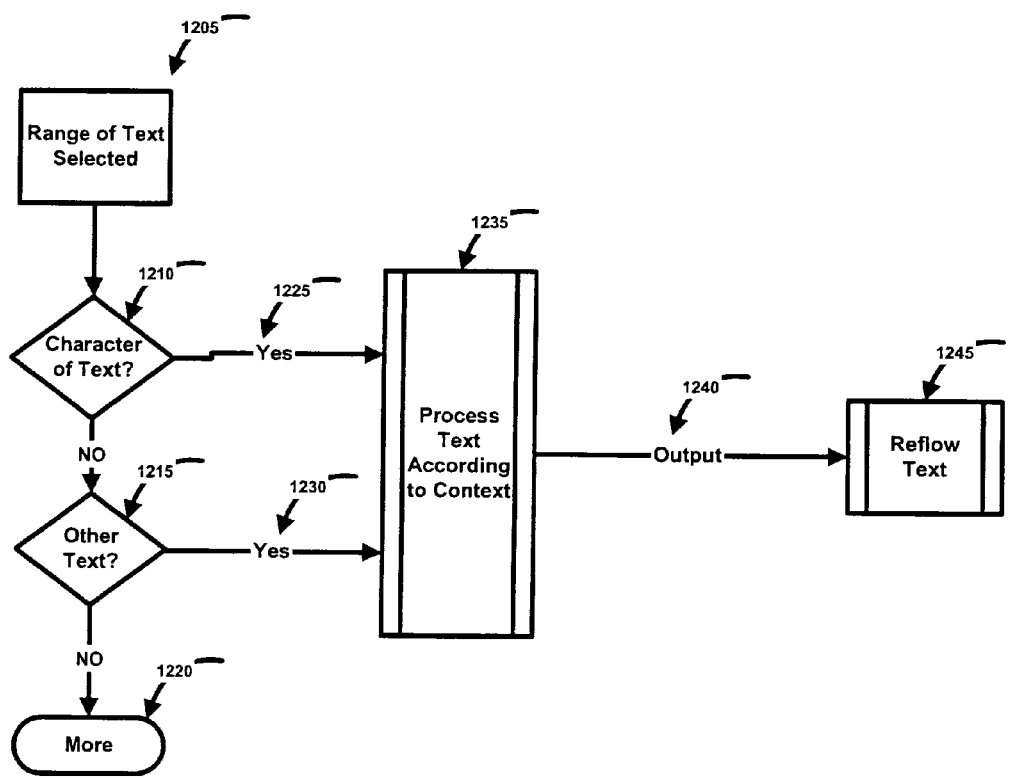
FIG. 12 shows an example embodiment of a context decision engine.

FIG. 12 is a flowchart of an example embodiment of a context decision engine. For purposes of illustration this figure is directed to an embodiment functioning with text, although the scope of the claimed subject matter is not limited in this respect. As taught above, computer objects, audio data, visual data, timing data, and physical data, to mention but a few of the possible applications, may all be treated in a similar manner. In the current example, a region of text is first selected at block 1205. The engine may determine the nature of the region selected for reflow so that the engine can properly identify the sub-regions so to appropriately structure the reflow. The engine may accomplish this in part from an analysis of the context in which the text arises. At block 1210, the engine may evaluate whether the selection is of a character of text. If the area selected is comprised of a series of text characters the engine may transfer via line 1225 a context indication of characters of text to the processing module at block 1235. At block 1235, other input data such as beginning and ending stop values and a function may be applied to the selected area. The results generated at block 1235 may be output via line 1240 in the form of reflowed text at block 1245. If the region of text selected for alteration is determined as not a character at block 1210, processing may continue to evaluate for other forms of text such as, line, paragraph, section, linked box, table row, table column, and path, to name but a few, at block 1215. Similarly to line 1225, line 1230 may convey to block 1235 a determination of a detected text type. If text is not detected at block 1225 processing may continue at block 1220.

Figure 13:
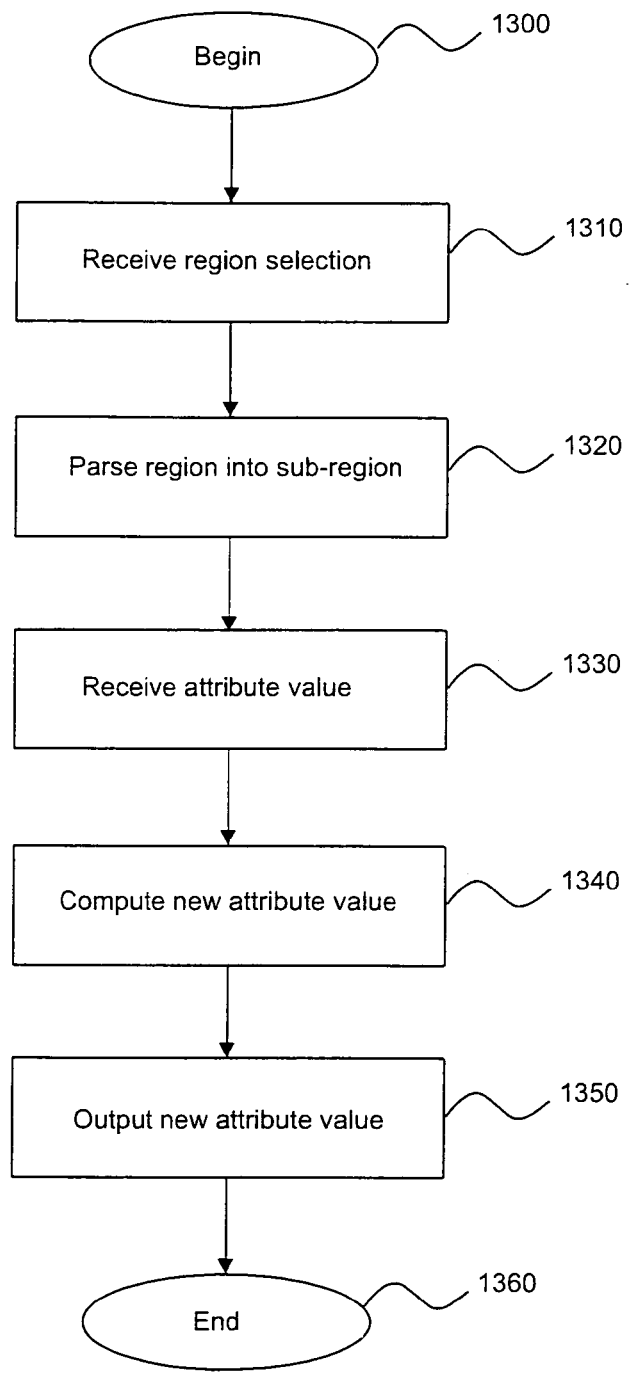
FIG. 13 is a flow chart depicting an example embodiment of a method of computing a new attribute value.

FIG. 13 is a flow chart depicting an example embodiment of a method for computing a new attribute value. A process may begin at block 1300 perhaps under the direction of a user or computing program. At block 1310 a region selection may be received. A region may be a line or lines of text, for example. At block 1320 the region received from block 1310 may be parsed into one or more sub-regions. At block 1330 an attribute value may be received from an attribute source. For an embodiment, the attribute source may include text or computer objects and the attribute value may describe some attribute such as size, although the scope of the claimed subject matter is not limited in these respects. At block 1340 a new attribute value based at least in part upon the attribute value received from block 1330 may be generated. Other example factors that may contribute to the generation of new attribute values have been discussed above. At block 1350 a new attribute value may be output. For an embodiment the new attribute value output at block 1350 may be output to, for, with, or in a sub-region such as one resulting from operation of block 1320. The process may end at block 1360. An embodiment in accordance with claimed subject matter may include all, more than all, or less than all of blocks 1300-1360. Furthermore, the order of blocks 1300-1360 is merely an example order and the scope of the claimed subject matter is not limited in this respect.

Figure 14:
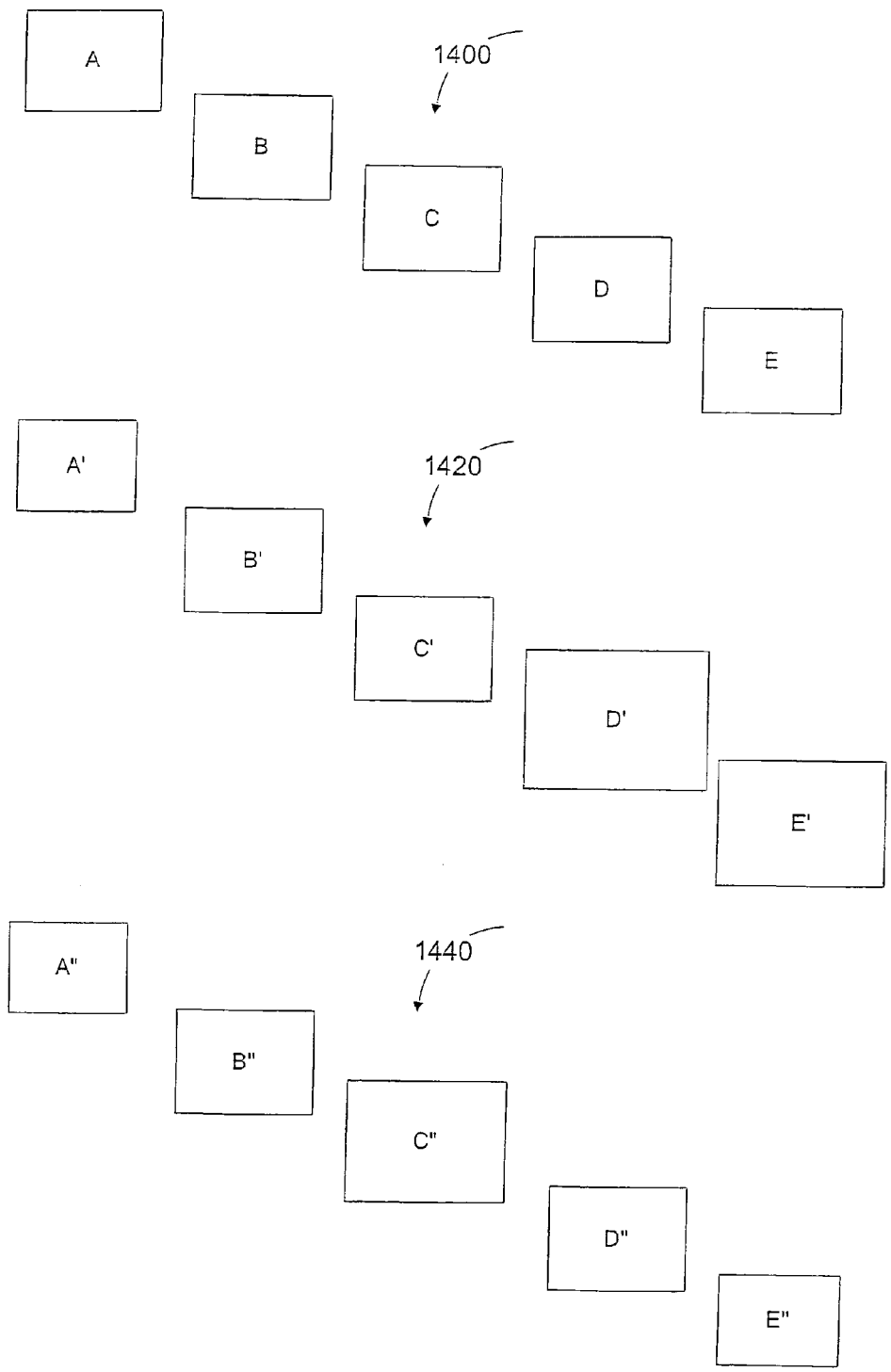
FIG. 14 is a diagram illustrating results achieved by an embodiment for variably scaling a size attribute utilizing a user selected order.

FIG. 14 is a diagram depicting transformations possible by one or more embodiments. At the top of the page, in series 1400, are rectangles A, B, C, D, and E. These rectangles may represent a series of five objects. They may be text boxes, pictures, or images by way of non-limiting example. In 1400 the rectangles are shown contiguous with each other but this is not a requirement. For example, they may be a series of five images, each on a separate page such as where each is placed at the beginning of a different chapter in a book. A user has the option to select all, none, or only some of the rectangles for transformation. In one embodiment the order in which a user selects the objects is the order in which the transformation is applied to the objects. If, for example, a user selects A, then E, and then D in that order from series 1400 and applies a linear function a possible output is depicted by the arrangement shown in series 1420 comprising rectangles A', B', C', D', and E'. A was the first selected and A' is rendered smaller than the other rectangles. Neither B nor C were selected so neither B' or C' depicts a transformed rectangle. E was chosen after A and E' is now larger than E in series 1400. Finally, D was the selected last and D' is the largest of any of the rectangles in series 1420. Series 1440 demonstrates where different output is generated where a user selects A, C, and then E in that order from series 1400 and applies a bell function. A is rendered a smaller size at one end of the bell curve, as shown by A" in series 1440, B was not selected and is shown unaltered by B", C was selected at the midpoint of the selection process and is rendered the largest, as shown by C", D was also not selected and is unchanged as D", and finally E was selected last as an endpoint for the bell function and is now the same size as A" and is depicted by E". In one or more alternative embodiments the transformation may be applied in a different order than just described such as for example from the front to the rear of a document with only selected objects scaled. Size and order are merely example attributes to vary for purposes of illustration but the claimed subject matter is not limited in these respects. As taught above, any attribute can be transformed in any order.

Figure 15:
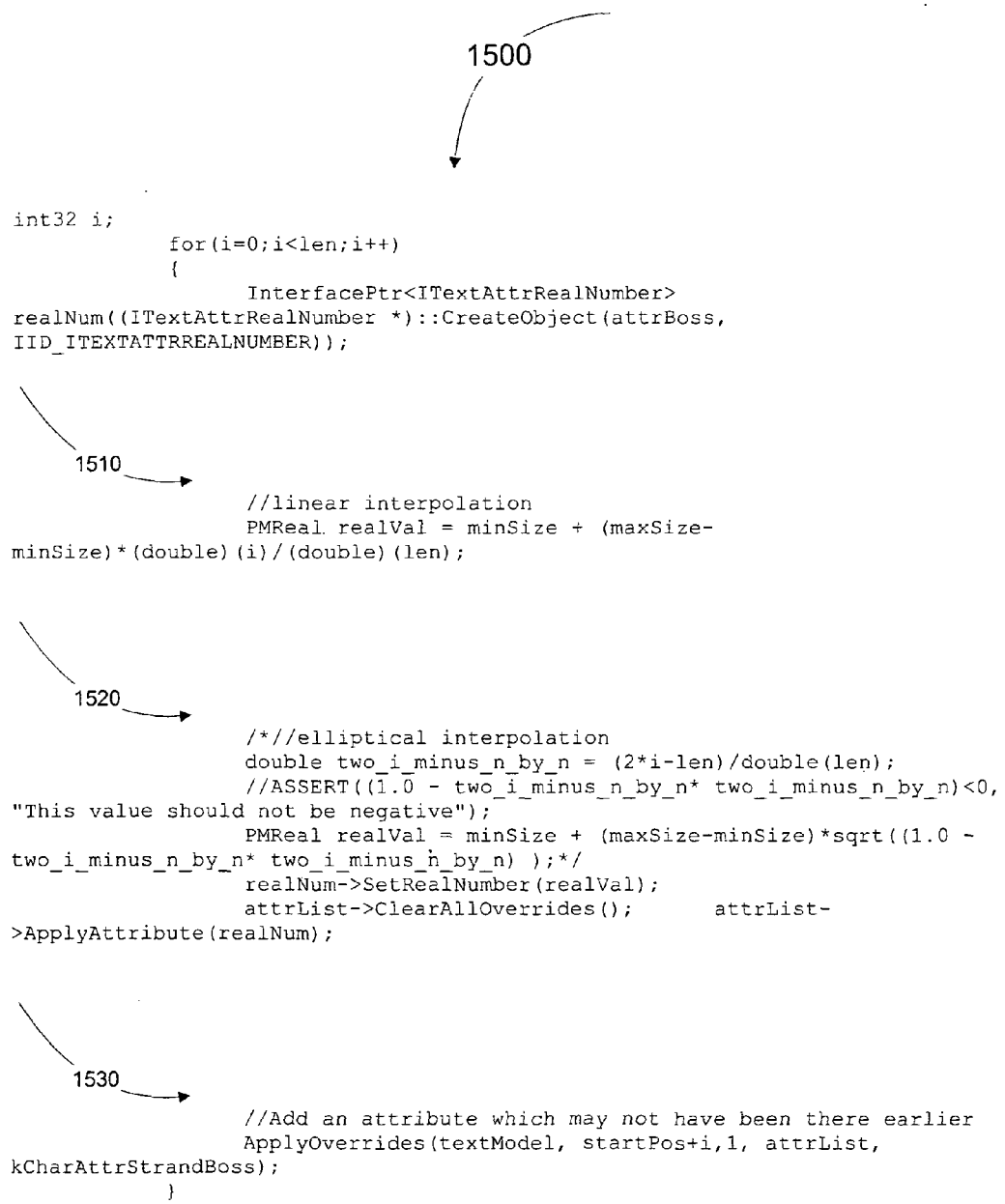
FIG. 15 shows and example embodiment of computer code capable of varying the size attribute of text using either a linear or elliptical interpolation function and adding an attribute value not earlier present.

FIG. 15 is an example embodiment of computer code for variably scaling the size attribute of text and adding to text an attribute value not previously present. The computer code may run on a computer system the same, similar, and/or relating to the system of FIG. 10 wherein the system may comprise one or more of the functional blocks described in, or describing, FIG. 10. However, the scope of the claimed subject matter is not limited in these respects. The capabilities of this example embodiment are selected merely for purposes of illustration and the claimed subject matter is not limited in these respects. Computer code 1500 may, as in this embodiment, be coded in the C++ language and be suitable for use with the Adobe® InDesign® CS2 computer software available from Adobe Systems Incorporated of San Jose, Calif., USA. Alternatively, the example embodiment may be coded in a different computer language and be suitable for use either with Adobe® InDesign® CS2 or some other computer software, although the scope of the claimed subject matter is not limited in this respect. Beginning at line 1510 the example computer code may perform a linear interpolation function to calculate then apply appropriate step sizes to variably scale text linearly over a user-selected range. Beginning at line 1520 is an example of how an elliptical interpolation may be coded. Similarly to the sections of code beginning at lines 1510 and 1520 alternative embodiments of the code may calculate appropriate values for other interpolation functions such as for example, but not limited to, sinusoidal or parabolic functions. Beginning at line 1530 the example code illustrates how an attribute that was not previously present may be added to selected text. These are merely example illustrations of the above concepts wherein other illustrations may apply as well, and the scope of claimed subject matter is not limited in these respects.

In the preceding description, various aspects of claimed subject matter have been described. For purposes of explanation, systems and configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

What is claimed is:

1. A method, comprising:
   performing by a computer:
   receiving input which indicates selection of a text region;
   parsing the selected text region into a plurality of sub-regions;
   receiving, for at least one attribute for the selected text region, a beginning attribute value and an ending attribute value, wherein the at least one attribute defines a characteristic of text contained in the selected text region and is stored in association with the text contained in the selected text region;
   determining, dependent on the beginning attribute value and the ending attribute value, a plurality of attribute values, wherein each one of the plurality of attribute values corresponds to a respective one of the plurality of sub-regions, wherein each one of the plurality of attribute values is different from each other one of the plurality of attribute values, and wherein the plurality of attribute values are determined such that the plurality of attribute values vary across the selected text region from the beginning attribute value to the ending attribute value; and
   for each one of the plurality of attribute values, applying the one of the plurality of attribute values to a corresponding one of the plurality of sub-regions.

2. The method of claim 1, wherein said receiving the beginning and the ending attribute values further comprises:
   receiving user input which indicates said beginning and ending attribute values.

3. The method of claim 1, further comprising:
   determining a context of the selected text region, wherein said parsing is dependent on the context, wherein the context indicates one or more of the following text forms: a line, a paragraph, a section, a linked box, a table row, a table column, or a path, and wherein each one of the plurality of sub-regions is one of the indicated text forms.

4. The method of claim 1, wherein determining the plurality of attribute values comprises:
   receiving a function selection;
   inputting the beginning attribute value and the ending attribute value to said function; and
   evaluating said function.

5. The method of claim 1, wherein determining the plurality of attribute values comprises:
   writing the plurality of attribute values to a data structure.

6. The method of claim 1, wherein determining the plurality of attribute values comprises:
   displaying a result generated by determining the plurality of attribute values.

7. The method of claim 1, wherein said receiving input which indicates selection of a text region comprises receiving user input which indicates selection of the text region.

8. The method of claim 1, wherein the plurality of attribute values comprise text size.

9. The method of claim 1, wherein the plurality of attribute values comprise text size and text flow direction relative to a curve.

10. A non-transitory storage medium having stored thereon instructions executable by an attribute processor to:
    receive input which indicates selection of a text region;
    parse the selected text region into a plurality of sub-regions;
    receive, for at least one attribute for the selected text region, a beginning attribute value and an ending attribute value, wherein the at least one attribute defines a characteristic of text contained in the selected text region and is stored in association with the text contained in the selected text region;
    determine, dependent on the beginning attribute value and the ending attribute value, a plurality of attribute values, wherein each one of the plurality of attribute values corresponds to a respective one of the plurality of sub-regions, wherein each one of the plurality of attribute values is different from each other one of the plurality of attribute values, and wherein the plurality of attribute values are determined such that the plurality of attribute values vary across the selected text region from the beginning attribute value to the ending attribute value; and
    for each one of the plurality of attribute values, applying the one of the plurality of attribute values to a corresponding one of the plurality of sub-regions.

11. The non-transitory storage medium of claim 10 wherein said reception of the beginning and the ending attribute values further comprises:
    receiving user input which indicates said beginning and ending attribute value.

12. The non-transitory storage medium of claim 10 wherein the instructions further operatively enable said attribute processor to:
    determining a context of the selected text region, wherein said parsing is dependent on the context, wherein the context indicates one or more of the following text forms: a line, a paragraph, a section, a linked box, a table row, a table column, or a path, and wherein each one of the plurality of sub-regions is one of the indicated text forms.

13. The non-transitory storage medium of claim 10 wherein said determination of the plurality of attribute values comprises:
    receiving a function selection;
    inputting the beginning attribute value and the ending attribute value to said function; and
    evaluating said function.

14. The non-transitory storage medium of claim 10 wherein said determination of the plurality of attribute values comprises:
    writing the plurality of attribute values to a data structure.

15. The non-transitory storage medium of claim 10 wherein said determination of the plurality of attribute values comprises:
    displaying a result generated by determination of the plurality of attribute values.

16. An apparatus, comprising, an attribute processor adapted to:
    receive input which indicates selection of a text region;
    parse the selected text region into a plurality of sub-regions;

receive, for at least one attribute for the selected text region, a beginning attribute value and an ending attribute value, wherein the at least one attribute defines a characteristic of text contained in the selected text region and is stored in association with the text contained in the selected text region;

determine, dependent on the beginning attribute value and the ending attribute value, a plurality of attribute values, wherein each one of the plurality of attribute values corresponds to a respective one of the plurality of sub-regions, wherein each one of the plurality of attribute values is different from each other one of the plurality of attribute values, and wherein the plurality of attribute values are determined such that the plurality of attribute values vary across the selected text region from the beginning attribute value to the ending attribute value; and for each one of the plurality of attribute values, applying the one of the plurality of attribute values to a corresponding one of the plurality of sub-regions.

17. The apparatus of claim 16 wherein the attribute processor is further adapted to:
receive user input which indicates the beginning and the ending attribute values.

18. The apparatus of claim 16, wherein the attribute processor is further adapted to:
determining a context of the selected text region, wherein said parsing is dependent on the context, wherein the context indicates one or more of the following text forms: a line, a paragraph, a section, a linked box, a table row, a table column, or a path, and wherein each one of the plurality of sub-regions is one of the indicated text forms.

19. The apparatus of claim 16 wherein the attribute processor is further adapted to determine the plurality of attribute values by:
receiving a function selection;
inputting the beginning attribute value and the ending attribute values to said function; and
evaluating said function.

20. The apparatus of claim 16 wherein the attribute processor is further adapted to:
output the plurality of attribute values by writing the plurality of attribute values to a data structure.

21. The apparatus of claim 16 wherein said attribute processor is further adapted to:
output the plurality of attribute values by displaying a result generated by determination of the plurality of attribute values.

22. An apparatus comprising:
means for receiving input which indicates selection of a text region;
means for parsing the selected text region into a plurality of sub-regions;
means for receiving, for at least one attribute for the selected text region, a beginning attribute value and an ending attribute value, wherein the at least one attribute defines a characteristic of text contained in the selected text region and is stored in association with the text contained in the selected text region;
means for determining, dependent on the beginning attribute value and the ending attribute value, a plurality of attribute values, wherein each one of the plurality of attribute values corresponds to a respective one of the plurality of sub-regions, wherein each one of the plurality of attribute values is different from each other one of the plurality of attribute values, and wherein the plurality of attribute values are determined such that the plurality of attribute values vary across the selected text region from the beginning attribute value to the ending attribute value; and
means for, for each one of the plurality of attribute values, applying the one of the plurality of attribute values to a corresponding one of the plurality of sub-regions.

* * * * *